United States Patent [19]

Bimond et al.

[11] 4,175,424

[45] Nov. 27, 1979

[54] DEVICE FOR HANDLING AND TESTING A CELL ADAPTED FOR SAMPLING A PRESSURIZED FLUID

[75] Inventors: Jean-Pierre Bimond; Flavien Lazarre, both of Pau, France

[73] Assignee: Societe Nationale Elf Aquitaine (Production), Paris, France

[21] Appl. No.: 917,285

[22] Filed: Jun. 20, 1978

[30] Foreign Application Priority Data

Jul. 27, 1977 [FR] France ................................ 77 23017

[51] Int. Cl.[2] ................................................ G01M 3/32

[52] U.S. Cl. .................................... 73/49.2; 73/421 R

[58] Field of Search ............. 73/422 R, 421 R, 421 B, 73/421.5 R, 425.4 R, 46, 49.2, 49.3, 49.8

[56] References Cited

U.S. PATENT DOCUMENTS

| | | | |
|---|---|---|---|
| 1,926,474 | 9/1933 | Allen et al. | 73/46 |
| 2,663,183 | 12/1953 | Huhn | 73/46 |
| 3,379,065 | 4/1968 | Gibbon | 73/425.4 R |

FOREIGN PATENT DOCUMENTS

| | | | |
|---|---|---|---|
| 2092965 | 1/1972 | France | 73/46 |

*Primary Examiner*—S. Clement Swisher
*Attorney, Agent, or Firm*—Brisebois & Kruger

[57] ABSTRACT

A closed receptacle has a wall defining an internal space in which the sampling cell is fixed in a stable position, and an external wall into which opens, through an aperture, a connecting conduit connected to the internal space. The receptacle has a removable seal which seals the periphery of the aperture. The apparatus includes a removable means for testing the receptacle, which defines together with the external wall of the receptacle, a sealed zone surrounding the connecting conduit and which communicates with pressure measuring means. The removable testing means includes a key for loosening and tightening the removable seal to permit testing the receptacle for sample leakage without loss of the contents of the receptacle.

6 Claims, 5 Drawing Figures

DEVICE FOR HANDLING AND TESTING A CELL ADAPTED FOR SAMPLING A PRESSURIZED FLUID

The present invention relates to a device for transporting pressurized samples of fluids under conditions meeting the safety requirements of the International Air Transport Association.

Cells for sampling pressurized fluids, which have a capacity of about 500 cubic centimeters are already known, said cells being adapted to be filled with a fluid under a pressure of as high as 350 bars. These known cells meet all the safety requirements defined in the various regulations concerning the use and the handling of pressurized containers on land and at sea, but they are not accepted by the aeronautical companies on their "mixed" (cargo-plus-passenger) flights.

In accordance with the regulations of the International Air Transport Association (17th Edition, P.B. 160, 1216 Cointrin—Geneva, Switzerland, Note 251, page 92), gaseous hydrocarbons such as butane and the like may be transported "under an absolute pressure not higher than 9.8 kg/cm$^2$ at 54.4° C. (140° psi at 130° F.)"; furthermore "the devices and the closure mechanisms must be able to resist an internal manometric pressure of 19.3 kg/cm$^2$ (275 psi)".

The present invention allows the problems arising from this situation to be solved by providing a handling device which is acceptable to the Air Transport Services, as said device comprises a receptacle wherein the fluid, when accidentally released from the cell said receptacle, is under a pressure the maximum value of which is equal to the allowed maximum pressure.

The device according to the invention for handling a cell for sampling a pressurized fluid constituted by a closed receptacle having an internal wall delimiting an internal space equipped with means for fixing said sampling cell in a stable position, and an external wall into which opens, through an aperture, a connecting conduit connected to said internal space, said receptacle being provided with removable sealing means, said external receptacle wall comprising means for fixing said connecting conduit in such a manner that the latter is sealingly applied to the periphery of said aperture, said device further comprising removable testing means for testing said handling device, said testing means delimiting together with said external wall of said receptacle, in the zone surrounding the orifice of said connecting conduit opening into said internal space, a space which communicates with pressure measuring means and which is removably connectable to a storing container containing said fluid, said removable testing means comprising means for controlling said removable sealing means of said connecting conduit opening into said internal space of said receptacle.

In such device, the means for fixing said removable testing means in such a manner that the periphery of the connecting conduit orifice is tightly engaged are constituted by a first annular frustoconical bearing provided on the external wall of said receptacle and surrounding the orifice of said conduit, and a second annular frustoconical bearing the opening of which is oriented in a direction opposite to that of said first annular bearing while said removable testing means comprise two annular frustoconical bearings each of which has a profile such that it can be applied to one of said bearings of the external surface of the receptacle, said removable testing means being constituted by two elements provided with means allowing two said elements to be displaced with respect to each other and to be locked in a predetermined position, each one of said elements being provided with annular frustoconical bearings.

In one preferred embodiment of the invention, said means for displacing said two elements with respect to each other and for locking the same in a predetermined position are constituted by a male thread provided on one of said elements and a corresponding female thread provided on the other element, and by a lever which permits rotating with respect to one of said elements that element which does not surround said aperture communication with said internal space of said receptacle.

Generally, the volume of the internal space of the receptacle, minus the volume occupied by the sampling cell and by the means for fixing said sampling cell on the internal wall of the receptacle, is a multiple of the inner volume of the sampling cell, said multiple being at least equal to the ratio of the maximum pressure of the fluid contained in the sampling to the allowable pressure as defined by the Air Transport Services.

With a view to providing a considerable safety margin, the receptacle and the removable testing means are constructed in such a manner that they can resist an internal pressure twice as high as the maximum pressure authorized by the Air Transport Services.

In a preferred embodiment, the means for fixing the sampling cell in a stable position in the internal space of the closed receptacle are constituted by two fixed, spaced collars provided on the outer periphery of the cell and associated to three lockig rings a first one of which is fixed to a first element of said receptacle, while a second one of said locking rings is fixed to the inner periphery of a second element of said receptacle and connected by a spring to the third one of said locking rings which is linearly movable within said second receptacle element, said first receptacle element being linearly and rotatingly movable with respect to said second receptacle element by means of a thread, said first locking ring engaging a first collar, and said second collar engaging said third locking ring in such a manner that when the two receptacle elements are assembled by screwing said thread, said spring is compressed by the relative displacement of said second and third locking rings toward each other.

The invention will be descirbed in a more detailed manner with reference to the appended FIGS. which are given by way of example, but not of limitation.

FIG. 1 shows a known sampling cell placed in a receptacle.

FIG. 2 schematically shows a receptacle of this invention for a sampling cell.

Figure 1:
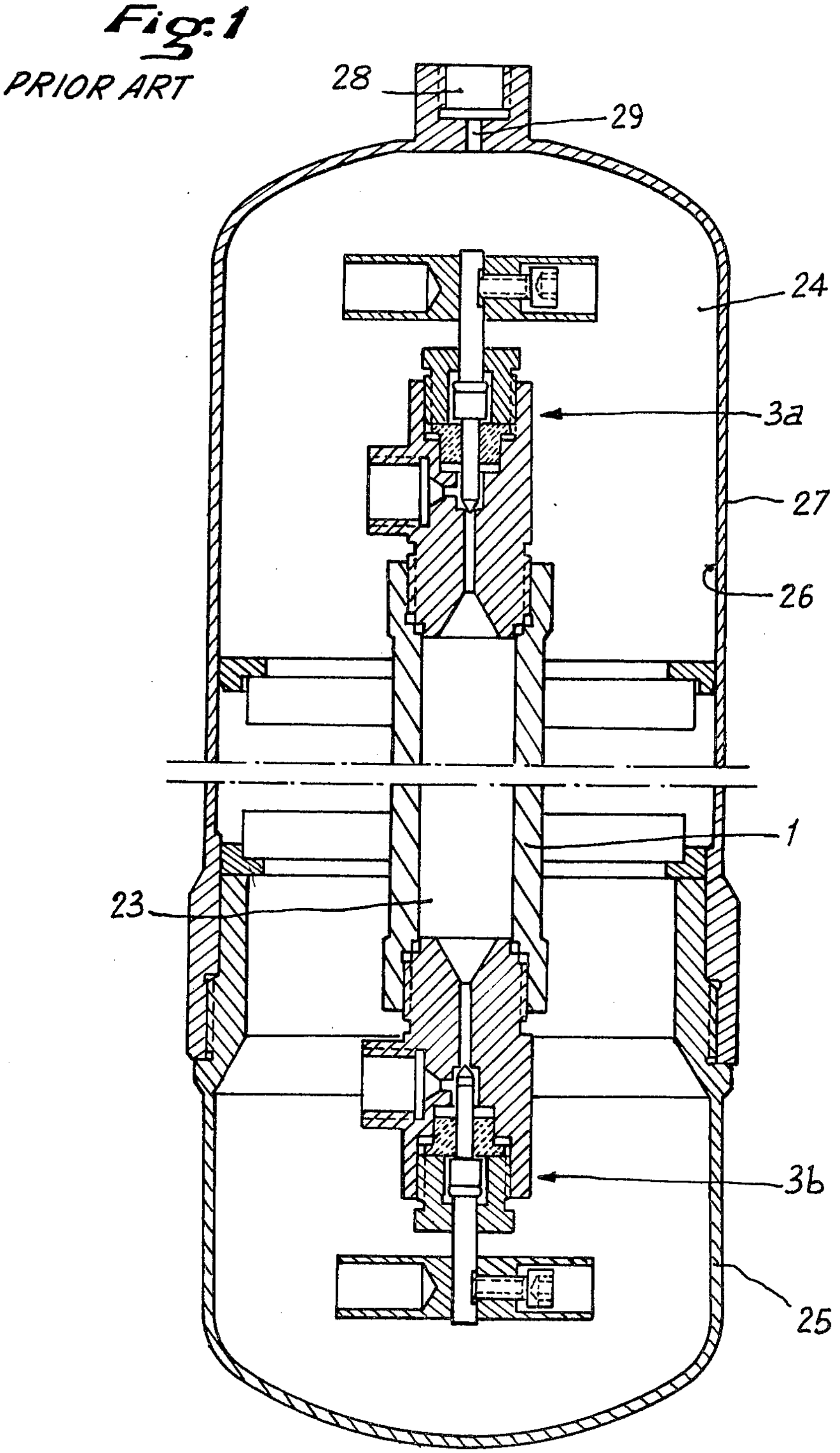
Fig. 1 PRIOR ART
FIG. 1 shows an embodiment of a sampling cell of pressurized fluid such as described in the Applicant's French Patent specification No. 1,460,865 filed on Oct. 21, 1965.

A cell in the form of a cylindrical tube 1 made of stainless steel is sealed at both ends so as to be able to resist elevated pressures up to 4000 kg/cm$^2$, for example, by means of a valve 3*a* mounted at one end of the tube and a valve 3*b* mounted on the other end thereof. In certain embodiments, one of these valves may be replaced by a plug (not shown in the FIG.).

Each one of valves 3*a*, 3*b* comprises the elements described and designated by reference numerals 4 to 22 in French Patent specification No. 1,460,865.

The cell delimits an inner space 23 occupied by the sample of pressurized fluid.

Figure 2:
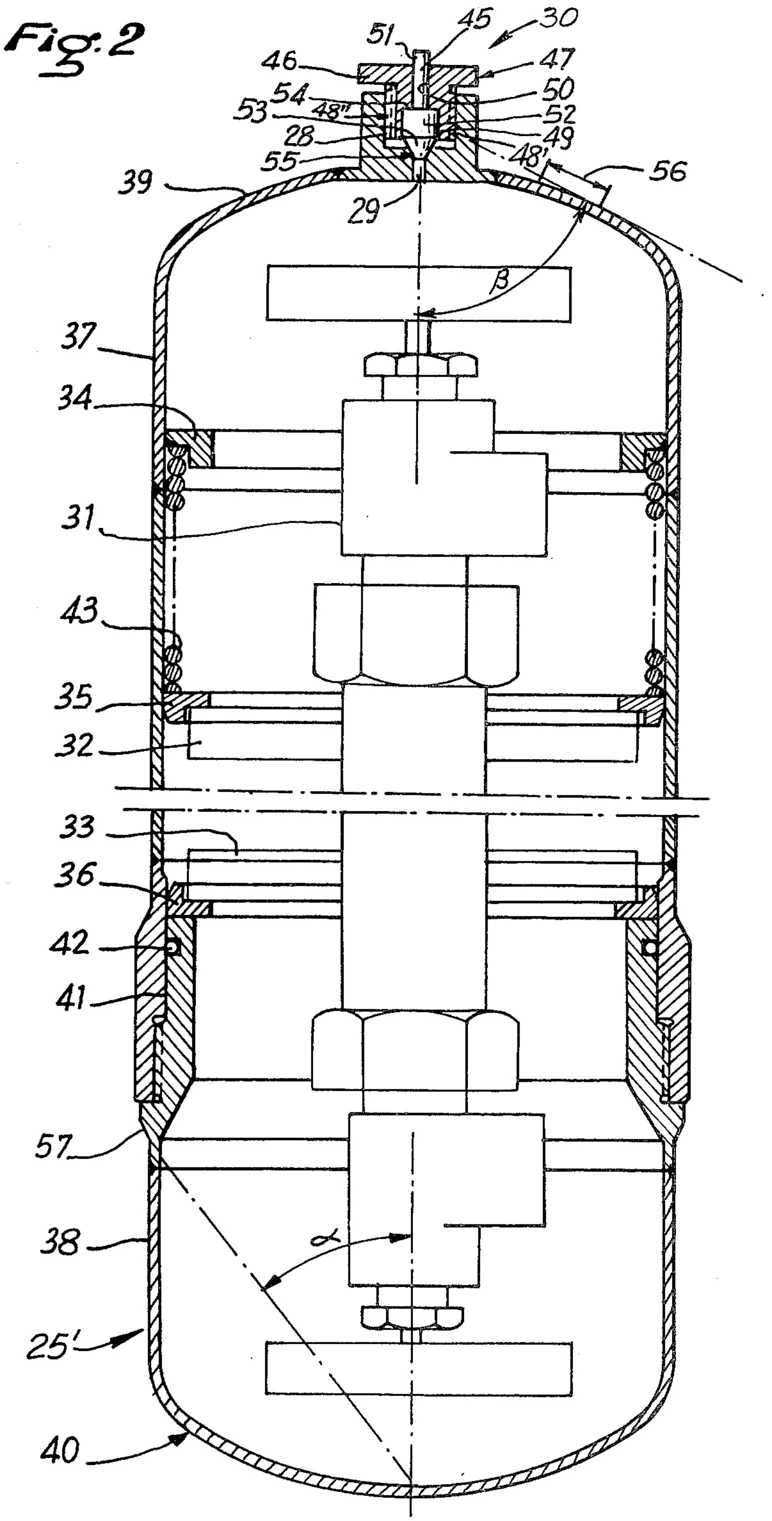
Figure 4:
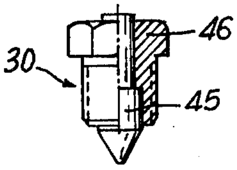
FIG. 4 is a diagrammatic view of removable sealing means.

The sampling cell described hereinabove is fixed in an internal space 24 delimited by a receptacle 25. Receptacle 25 comprises an internal wall 26 defining internal space 24, and an external wall 27 in which a nozzle 28 opens, said nozzle being connected to a connecting conduit 29 which communicates with internal space 24; removable sealing means 30 are provided, which sealing means are shown in FIGS. 2 and 4. Internal wall 26 comprises means for fixing the sampling cell in a stable position in the median zone of internal space 24.

Figure 3:
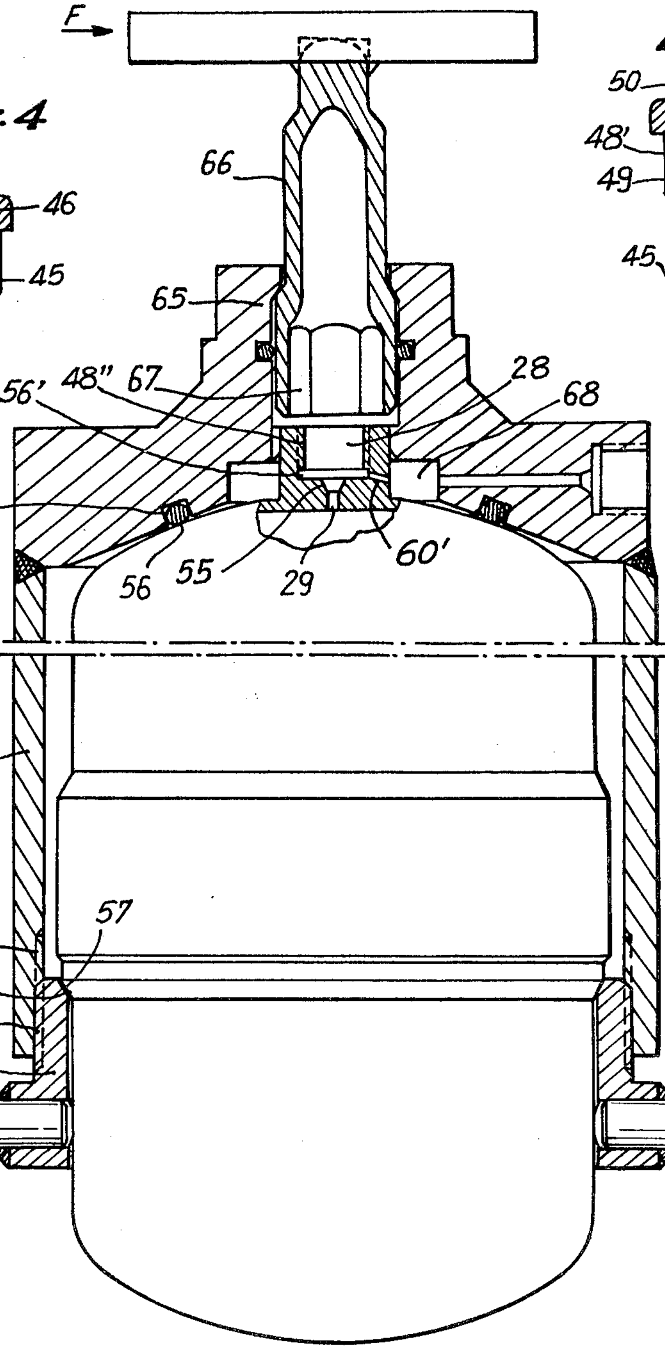
FIG. 3 shows diagrammatically a removable testing means.

FIG. 3 shows the outer profile, or periphery, 31 of the sampling cell fixed in the median zone of the inner space 24 defined by receptacle 25.

FIG. 2 shows by way of example but not of limitation an embodiment of the means for fixing the cell; in this embodiment said fixing means are constituted by an arrangement comprising two collars 32 and 33 fixed to the outer periphery 31 of the cell and cooperating with three locking rings 34, 35 and 36 mounted on the internal wall 26 of receptacle 25'.

Receptacle 25' (FIG. 2) is constituted by two cylindrical portions 37 and 38 each of which is provided with an end portion in the form of a substantially spherical dome 39, 40 through one of which (39) passes conduit 29.

The two portions or elements 37 and 38 are movable with respect to each other by means of a threading arrangement comprising, for example, a female thread provided on portion 37 and a male thread provided on portion 38; furthermore, said portions are in engagement along a cylindrical wall 41 comprising sealing means 42.

A locking ring 34 is fixed on cylindrical portion 37, a second locking ring 36 is fixed on cylindrical portion 38, while a third locking ring 35 is slideably mounted within cylindrical portion 37 and by action of a spring 43 bears on collar 32 integral with the cell and thus clamps the cell between the portions 37 and 38 of the receptacle.

When portion 38 is screwed onto portion 37, locking ring 36 engaging collar 33 exerts a pressure on said collar and causes the same to be displaced in such a way that collar 32 which is also mounted on the outer periphery 31 of the cell is displaced and compresses the spring 43. Thus, the cell is fixed in a stable position within the internal space 24 of the receptacle.

The volume of internal space 24 of the receptacle, minus the volume occupied by the outer pheriphery 31 of the cell, and minus the volume occupied by the locking rings, the collars and the spring, is equal to the inner volume 23 of the cell mutiplied by a coefficient at least equal to the ratio of the maximum pressure of the sampled fluid occupying the volume 23, to the maximum pressure alowed in accordance with the regulations of the Air Transport Services.

As shown in FIG. 2, conduit 29 is provided with an external nozzle 28 equipped with a removable sealing means 30 of a type known per se. Sealing means 30 is constituted by a needle 45 which rests, on the one hand, on nozzle 28 and, on the other hand, on a bushing 46 movable with respect to nozzle 28.

Bushing 46 is provided with a nut-like head 47 and with an external male thread 48' cooperating with an internal female thread 48" provided on nozle 28.

Bushing 46 is provided with a coaxial cylindrical hole divided into two parts 49 (directed inwardly) and 50 (directed outwardly); the diameter of portion 49 is larger than the diameter of portion 50.

Needle 45 comprises, from its outer end toward its inner end, two cylindrical sections 51 and 52 and a frustoconically tapering section 53. Sections 52 and 51 slide respectively in cylindrical portions 49 and 50 of bushing 46 and are connected to each other by a planar annular portion 54 constituting a stop member through which needle 45 rests on bushing 46.

Frustoconical portion 53 bears on a surface 55 when sealing means 30 is in its closed or sealing position, said surface 55 having a profile similar to that of frustoconical portion 53; surface 55 is defined within the zone connection nozzle 28 to conduit 29.

FIG. 4 schematically shows the removable sealing means the outer periphery of which is represented at the left side of the Figure, while a longitudinal section is shown at the right side of said Figure, the reference numerals corresponding to those of FIG. 2.

Figure 5:
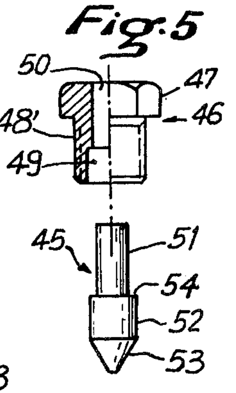
FIG. 5 is a schematic view of the removable sealing means, the various elements being separated from each other.

FIG. 5 is a diagrammatical view of the same removable sealing means, wherein elements 45 and 46 are separated.

As shown furthermore in FIG. 2, the external periphery of the hemispherical portion 39 of element 37 is provided with an annular bearing surface 56 having a frustoconical profile and surrounding orifice 28 of conduit 29, whereas the external cylindrical periphery of element 38 is provided with an annular frustoconical bearing surface 57 the apex angle $\alpha$ of which is oriented in a direction opposed to that of apex angle $\beta$ of the annular frustoconical bearing 56.

FIG. 3 shows schematically and in section removable testing means 57. This testing means substantially comprises two annular members 58 and 59 which are movable linearly and angularly with respect to each other by means of a male thread 60 on surface 59 and a corresponding female thread 61 provided on bearing 58.

The bell-shaped portion of 58 caps receptacle 25; the engagement between bearing 58 and receptacle 25 is obtained by a senling means 62 mounted on the inner wall of element 58 and which engages frustoconical annular surface 56.

The annular element 59 rest on receptacle 25 by means of a frustoconical annular bearing surface 63 which rests in turn on the annular frustoconical bearing surface 57 defined on the cylindrical periphery of portion 38 of receptacle 25.

Annular element 59 is provided with means such as arms 64a and 64b allowing the thread 60 to be screwed onto thread 61.

Element 58 is provided with a hole 65 wherein a key 66 is displaceable, the profile 67 of said key being such that said key caps the periphery 47 of the removable sealing means 44.

The removable testing means 57 and, more particularly, element 58 delimit together with the external wall of receptacle 25 a space 68 surrounding orifice 28 of conduit 29 connected to the inner space, said space 68 being defined by a tight envelope and communicating with means (not shown) for measuring the pressure and, in a removable manner, with a container of the fluid considered (not shown).

When receptacle 25 is received after transportation in the laboratory where the fluid contained in the cell has to be examined, a tightness test is carried out with the aid of removable testing means 57.

Testing means 57 is put in place and element 59 is screwed onto element 58 until tight engagement of device 62 with frustoconical annular bearing 56 is obtained.

By means of key 66 bushing 45 of removable sealing means 44 is unscrewed, whereby the internal space 24 of receptacle 25 is connected to space 68 and thus with pressure measuring means (not shown). Where a lateral port 60' (FIG. 3) is provided, the bushing 45 only needs to be slightly lossened. If the pressure thus measured is equal to atmospheric pressure, it can be inferred that no leakage from the cell had occurred during transport; the receptacle is then removed and the sampling cell is used in accordance with conventional procedure. If the pressure is higher than the atmospheric pressure, this shows that internal space 24 has been connected to inner space 23 of the cell. It is then still possible to convey the sample containing the air intially contained in space 24 to convenient storage means (not shown). By this method, it is possible to take approximate measurements and to proceed with various qualitative analyses.

In any event, if any leakage from the cell under high pressure has taken place, the pressure built upon in the receptacle will never be higher than the maximum pressure allowed by the Air Transport Services, such pressure presenting no danger to Air Transport vehicles and passengers.

When using the device according to the invention, it is possible to create a vacuum in the receptacle prior to transporting it. Thus, it is still possible to analyze semiquantitatively the content of the receptacle, even if the high pressure cell should leak.

The device according to the invention presents another advantage in that it allows a sample of a fluid from an oil field or the like located at any point in the world to be transported in less than five days to a laboratory equipped to carry out highly detailed analyses. Under these conditions, various constituents in the form of traces which may be absorbed by the steel walls, especially sulphur-containing compounds, will still remain in the fluid and can thus be detected.

The invention is not limited to the embodiments described and shown herein; numerous modifications and variants may be envisaged by those skilled in the art within the scope of the invention as defined by the appended claims.

What is claimed is:

1. A device for handling a cell for sampling a pressurized fluid, comprising a closed receptacle having an internal wall delimiting an internal space equipped with means for fixing said sampling cell in a stable position, and an external wall into which opens, through an aperture, a connecting conduit connected to said internal space, said receptacle being provided with removable sealing means, said external receptacle wall comprising means for fixing said connecting conduit in such a manner that the latter is sealingly applied to the periphery of said aperture, said device further comprising removable testing means for testing said handling device, said testing means delimiting together with said external wall of said receptacle, in the zone surrounding the orifice of said connecting conduit opening into said internal space, a space which communicates with pressure measuring means and which is removably connectable to a storing container containing said fluid, said removable testing means comprising means for controling said removable sealing means of said connecting conduit opening into said internal space of said receptacle.

2. The device of claim 1, wherein the means for fixing said removable testing means are constituted by a first annular frustoconical bearing provided on the external wall of said receptacle and surrounding the orifice of said conduit, and a second annular frustoconical bearing the opening of which is oriented in a direction opposite to that of said first annular bearing, while said removable testing means comprise two annular frustoconical bearings each of which has a profile such that it can be applied onto one of said bearings of the external surface of the receptacle, said removable testing means being constituted by two elements provided with means allowing said two elements to be displaced with respect to each other and to be locked in a predetermined position, each one of said elements being provided with annular frustoconical bearings.

3. The device of claim 2, wherein said means for displacing said two elements with respect to each other and for locking the same in a predetermined position are constituted by a male thread provided on one of said elements and a corresponding female thread provided on the other element, and by a lever which permits rotating with respect to one of said elements that element which does not surround said aperture communicating with said internal space of said receptacle.

4. The device of claim 1, wherein the volume of the internal space of the receptacle, minus the volume occupied by the sampling cell and by the means for fixing said sampling cell on the internal wall of the receptacle, is a multiple of the inner volume of the sampling cell, said multiple being at least equal to the ratio of the maximum pressure of the fluid contained in the sampling sample to the allowable pressure as defined by the Air Transport Services.

5. The device of claim 1, wherein the receptacle and the removable testing means are constructed in such a manner that they can resist an internal pressure twice as high as the maximum pressure authorized by the Air Transport Services.

6. The device of claim 2, wherein the means for fixing the sampling cell in a stable position in the internal space of the closed receptacle are constituted by two fixed spaced collars provided on the outer periphery of the cell and associated to three locking rings a first one of which is fixed to a first element of said receptacle, while a second one of said locking rings is fixed to the inner periphery of a second element of said receptacle and connected by a spring to the third one of said locking rings which is linearly movable within said second receptacle element, said first receptacle element being linearly and rotatingly movable with respect to said second receptacle element by means of a thread, said first locking ring engaging a first collar, and said second collar engaging said third locking ring in such a manner that when the two receptacle elements are assembled by the screwing means of said thread, said spring is compressed by the relative displacement of said second and third locking rings toward each other.

* * * * *